May 28, 1940.  J. N. HEINER  2,202,004
VALVE
Filed Dec. 20, 1938  2 Sheets—Sheet 1

John N. Heiner
INVENTOR

BY J. F. Mothershead

ATTORNEYS

May 28, 1940.     J. N. HEINER     2,202,004
VALVE
Filed Dec. 20, 1938     2 Sheets-Sheet 2
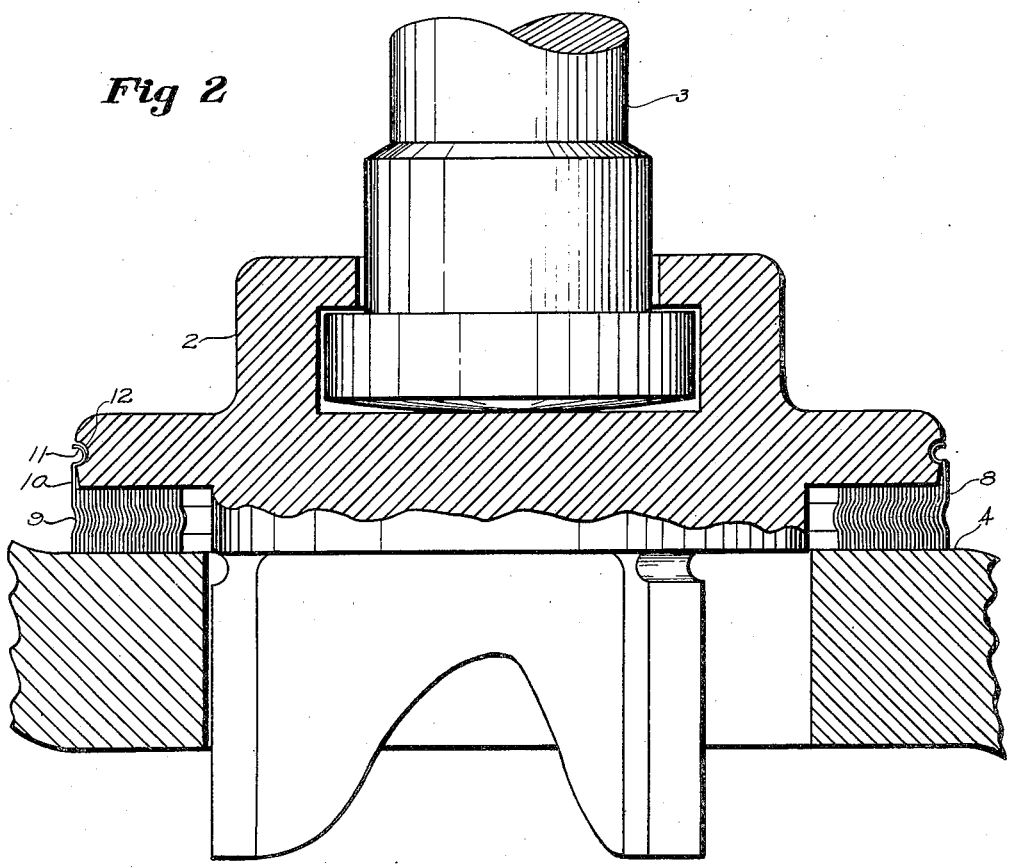
Fig 2
Fig 3
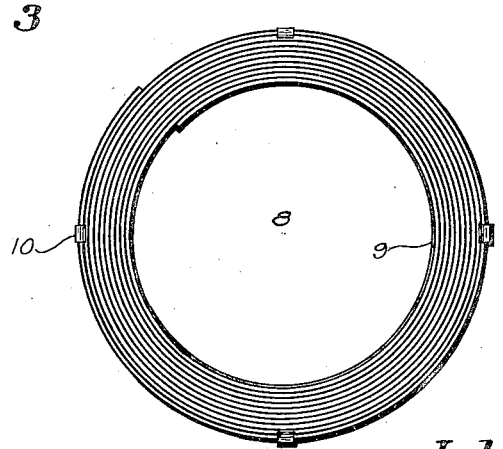
John N. Heiner
INVENTOR
BY
ATTORNEYS Patented May 28, 1940

2,202,004

UNITED STATES PATENT OFFICE 2,202,004

VALVE

John N. Heiner, Bethesda, Md.

Application December 20, 1938, Serial No. 246,860

1 Claim. (Cl. 251—160)

(Granted under the act of March 3, 1883, as amended April 30, 1928; 370 O. G. 757)

The invention described herein may be manufactured and used by or for the Government of the United States for governmental purposes in accordance with the provisions of the act of April 30, 1928 (ch. 460, 45 Stat. L. 467).

This invention relates to valves, but more particularly to the sealing members of valves such as globe valves.

The primary object of the invention is to provide a flexible metallic sealing member which is cheap and easy of manufacture, strong, durable, and efficient, and which will form a satisfactory seal with the minimum amount of pressure, and which is so constructed and arranged that the fluid pressure assists in expanding the flexible sealing member to increase the effectiveness of the seal.

With this in view, the invention consists of the novel construction of the spirally wound valve sealing member arranged between the valve disk body and its rigid seat.

Referring to the accompanying drawings:

Fig. 2 is an enlarged fragmentary vertical sectional view through the same parts, and Fig. 3 is a top plan view of the spirally wound sealing member.

Like numerals of reference indicate the same parts throughout the three figures, in which:

Figure 1:
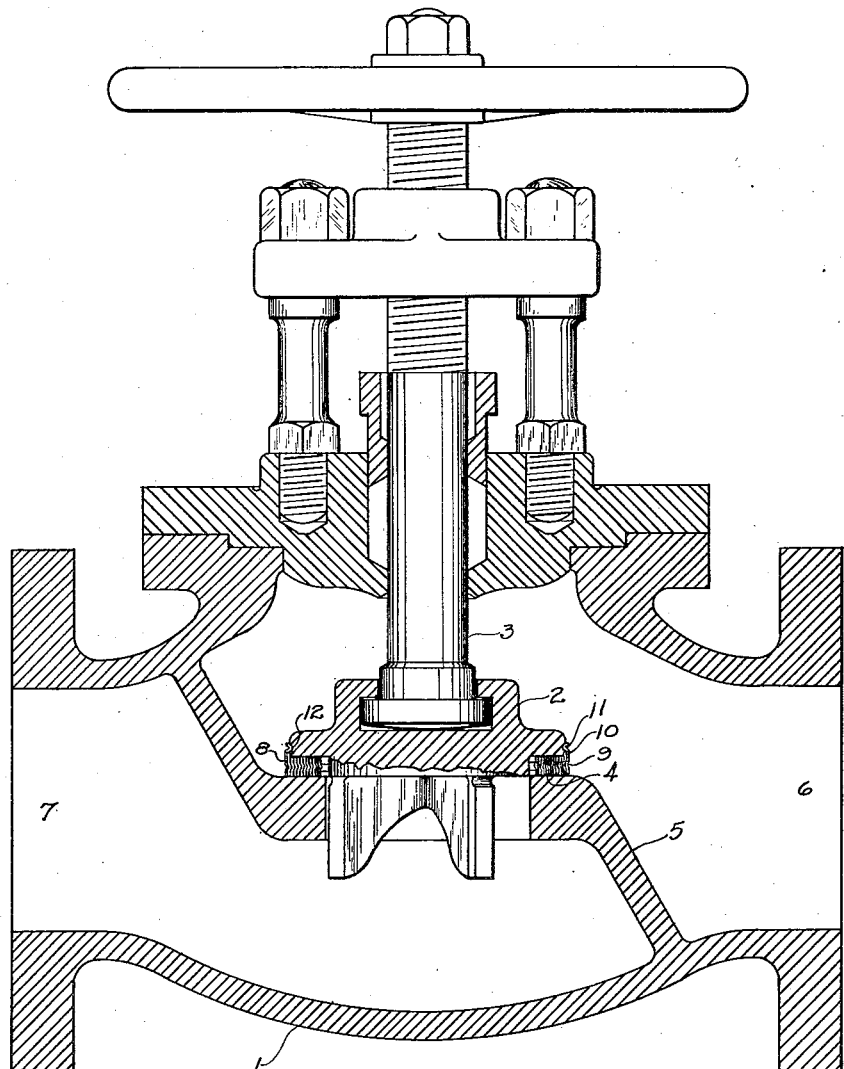
Fig. 1 is a vertical sectional view through a globe valve of conventional construction, illustrating the spiral flexible sealing member in operative position.

1 indicates a globe valve. 2 indicates the usual metallic valve disk. 3 indicates the valve stem. 4 indicates the usual rigid metallic valve seat located in the web 5 which separates the two valve ports or passages 6 and 7 of the valve.

While I have illustrated the invention as being applied to such conventional globe valve, the spiral, flexible metallic sealing member has equal application to valves of other types, or to analogous constructions wherein a sealing member or gasket is necessary or useful to hold against fluid pressure.

The flexible sealing member 8 is formed of a continuous strip of thin flexible metal in which there is formed a shallow longitudinal groove 9 which forms a complementary bead on the opposite side of the material. When this strip has been spirally and tightly wound the bead in the groove of each convolution nests in its adjacent convolution so that the series of convolutions which form the completed sealing member appear as is shown in Fig. 2. At the outermost convolution, there is applied an extension 10 having a bead 11 at its upper edge arranged for engagement in a complementary groove 12 supplied in the edge of the valve disk 2, the purpose of this construction being to retain the flexible valve sealing member in proper operative position when the valve is opened. It will be noted from Figs. 2 and 3, that the convolutions of the metallic strip lie snugly against and in close contact with one another with no spaces nor openings therebetween so that the adjacent convolutions cooperate to effectively resist the edgewise pressure imposed on the convolutions of the thin metallic strip by the movable valve disk 2.

In operation the convex surface of the shallow groove 9 in the convolutions of the flexible sealing member, is disposed to face the pressure side of the valve. It will thus be seen that in Figs. 1 and 2 the port or passage 7 is on the pressure side, while for a valve in which the port or passage 6 is on the pressure side, the flexible metallic strip would be wound so that the convex face of the groove in the convolutions would face the port or passage 6. In either event the pressure acting on the convex face of the groove tends to flatten the same and increase the width of the spirally wound metallic strip and thus force its upper and lower edges into closer and more intimate contact with the adjacent metal surfaces of the valve disk 2 and rigid seat 4. Thus while the pressure exerted edgewise of the convolutions of the metallic strip, tend to increase the depth of the continuous groove in the strip, the fluid pressure acting transversely and against the convex face of the groove tends to flatten out the groove and thus widen the strip to increase the effectiveness of the seal.

For the most efficient action of the seal, it is necessary that the continuous groove in the metallic strip be sufficiently shallow to cause the fluid pressure to exert a tendency to flatten the groove. A very shallow groove can only accomplish that result. If the groove is relatively deep, the edgewise pressure on the metallic strip will collapse it and the transverse fluid pressure will have no effective influence to straighten it out and the purpose of the groove to tend to widen the strip will be defeated.

Having thus described the invention, I claim:

The combination with a valve which includes a valve disk and seat, of continuous strip of thin flexible metal provided with a continuous longitudinal shallow groove on one side of the strip and a complemental bead on the reverse side of the strip, the strip being wound spirally so that the sides of the strip of each convolution are in close contact with the adjacent sides of the strip in the next adjacent convolution and in such manner that the bead of each convolution of the spirally wound strip nests in the groove in its adjacent convolution, the spirally wound strip being adapted for disposition between the contiguous faces of the valve disk and its seat, and having the convex surface of the said groove in the spirally wound continuous strip face the pressure side of the valve, the groove being sufficiently shallow to cause the fluid pressure to tend to flatten the groove and widen the spirally wound strip, the valve disk of the valve being provided with an annular groove adjacent its face, a plurality of extensions on the outermost convolution of the spirally wound strip, each of said extensions being provided with a bead for engagement with the annular groove in the valve disk to retain the spirally wound strip in effective position.

JOHN N. HEINER.